United States Patent Office 3,679,457
Patented July 25, 1972

3,679,457
METHOD FOR DETERMINING RELATIVE DEGREE OF CURE OF IMPREGNATED TIRE CORD
Jeanne E. Gordon, Granville, Ohio, assignor to Owens-Corning Fiberglas Corporation
Filed July 30, 1970, Ser. No. 59,502
Int. Cl. C03c 25/02; G01n 21/24
U.S. Cl. 117—66              2 Claims

ABSTRACT OF THE DISCLOSURE

A method for determining and controlling the degree of cure of a heat-curable composition. A heat-curable synthetic resinous composition comprising a vinyl chloride or a vinylidene chloride polymer is cured under a plurality of conditions differing in severity and the physical properties of each cured sample are determined. Each cured sample is extracted with an organic solvent, and the percent transmittance of the extract is spectrophotometrically determined in the visible region between 340–550 millimicrons. Cure of the same heat-curable composition is then controlled by monitoring the percent transmittance of extracts in the same solvent, measured by the same procedure, and increasing or decreasing the severity of the curing conditions as required to maintain the monitored transmittance at a desired level corresponding with desired physical properties. The present transmittance of the extract varies inversely as the degree of cure of the polymeric component. The method of this invention is particularly useful for controlling the cure of a resinous composition comprising a vinyl chloride or a vinylidene chloride polymer applied as a coating on glass filaments.

BACKGROUND OF THE INVENTION

This invention relates to a method for spectrophotometrically determining and controlling the degree of cure of a composition comprising a vinyl chloride or a vinylidene chloride polymer. Heat-curable compositions comprising vinyl chloride and vinylidene chloride polymers can be used to produce individually coated glass filaments. Such coated glass filaments are useful in the production of glass fiber reinforced elastomeric products.

Glass fibers have been used extensively as reinforcing materials for both thermosetting and thermoplastic resins. Highly desirable physical characteristics, including high strength, durability, lightweight and design flexibility have helped reinforced plastics gain steadily in market acceptance. Advances in glass fiber technology have brought about a similar utilization of glass fibers as a reinforcing material in elastomeric products. Such elastomeric products as drive belts, timing belts, hose and tires have greatly improved physical and mechanical properties when properly reinforced with glass fibers.

As used herein, the term "elastomer" is meant to include synthetic elastomeric or rubber-like materials such as neoprene, butadiene, chloroprene, isoprene, and the like, or copolymers thereof with acrylonitrile, styrene and the like, and especially the elastomeric materials which are curable or vulcanizable by thermal reaction to a set stage with a peroxide or through sulphur linkages. The term is also intended to include natural rubbers and modifications thereof such as chlorinated rubber and the like.

While the term "glass fibers" is preferably employed to define continuous glass fibers in the form of filaments, strands, yarn bundles, cords and fabrics formed thereof, it is also intended to include discontinuous fibers in the form of glass wool fibers and yarns and fabrics formed thereof and fibers of the continuous or discontinuous types which have been cut, chopped or otherwise reduced to shorter lengths but preferably to lengths greater than ⅛ inch. Included also are the crimped continuous or discontinuous fibers or strands, yarns and threads formed of the combination of crimped or uncrimped continuous and discontinuous fibers and fibrous bundles which have been plied or twisted in multiple groups to form yarns and cords, and fabrics formed thereof.

In order to fully utilize the glass fibers in reinforcing the elastomeric material, the glass fibers are impregnated with a resinous composition which contains components which are compatible with, and will cure in combination with, the elastomeric material. The impregnated glass fibers and the elastomeric material, when cured, form essentially a continuous phase.

To insure the maximum improvement in the physical and mechanical properties of the reinforced elastomeric product, the degree of cure of the resinous impregnant must be carefully controlled. Control of the degree of cure has been found to be especially critical in the production of glass fiber reinforced tire cord.

There has been a need for an accurate, dependable and rapid method of determining the degree of cure of impregnated tire cord. Although the time-temperature relationship of the tire cord passing through the oven can be carefully controlled, variations in the relative degree of cure of the cord often occur. These variations, which can significantly effect the physical properties of the cord, may be caused by such factors as a change in the ambient temperature, a difference in the age of the resinous coating, or a manufacturer's variation in the composition of raw materials used in the resinous coating.

SUMMARY OF THE INVENTION

In general, the method of this invention involves the spectrophotometric control of the cure of a heat-curable resinous coating comprising vinyl chloride or vinylidene chloride, which coating is suitable for use in impregnating glass fibers.

Glass fibers are coated with a composition comprising a vinyl chloride or a vinylidene chloride polymer or copolymer, and the composition is cured under a plurality of conditions differing in severity. The physical properties of each cured sample are determined. A portion of each cured sample is extracted with the same volume of ethyl acetate, methyl ethyl ketone or other suitable solvent, for a given time, e.g., 15 minutes. The spectrophotometric transmittance of the extract, containing dissolved portions of the cured impregnant, is determined in the visible range between 340–550 millimicrons. The percent transmittance varies inversely as the degree of cure of the polymer.

Control of cure of a heat-curable impregnant, having the same composition, is accomplished by monitoring the spectrophotometric transmittance of extracts of cured samples, in the same solvent, measured by the same procedure. The severity of the curing conditions is increased, decreased, or maintained constant as required to maintain the monitored transmittance at a desired level corresponding with desired physical properties.

REFERENCE TO DRAWINGS

Figure 3:
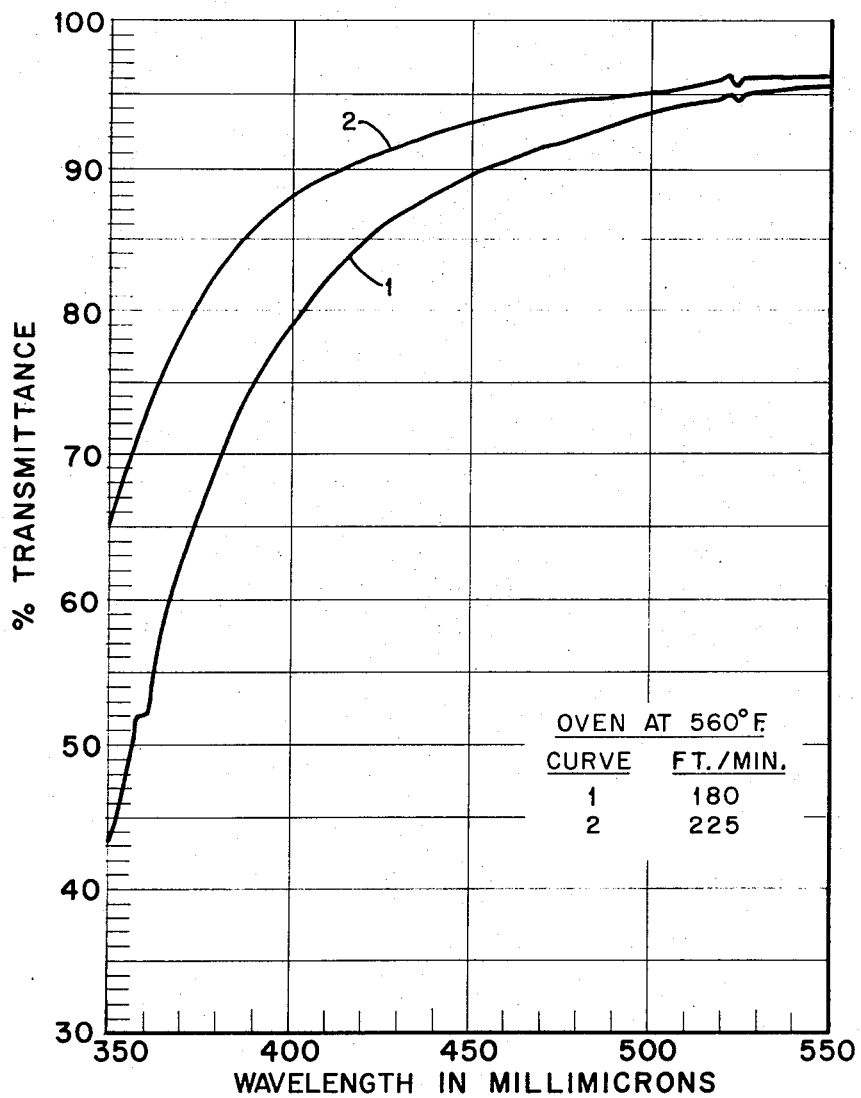
Figure 4:
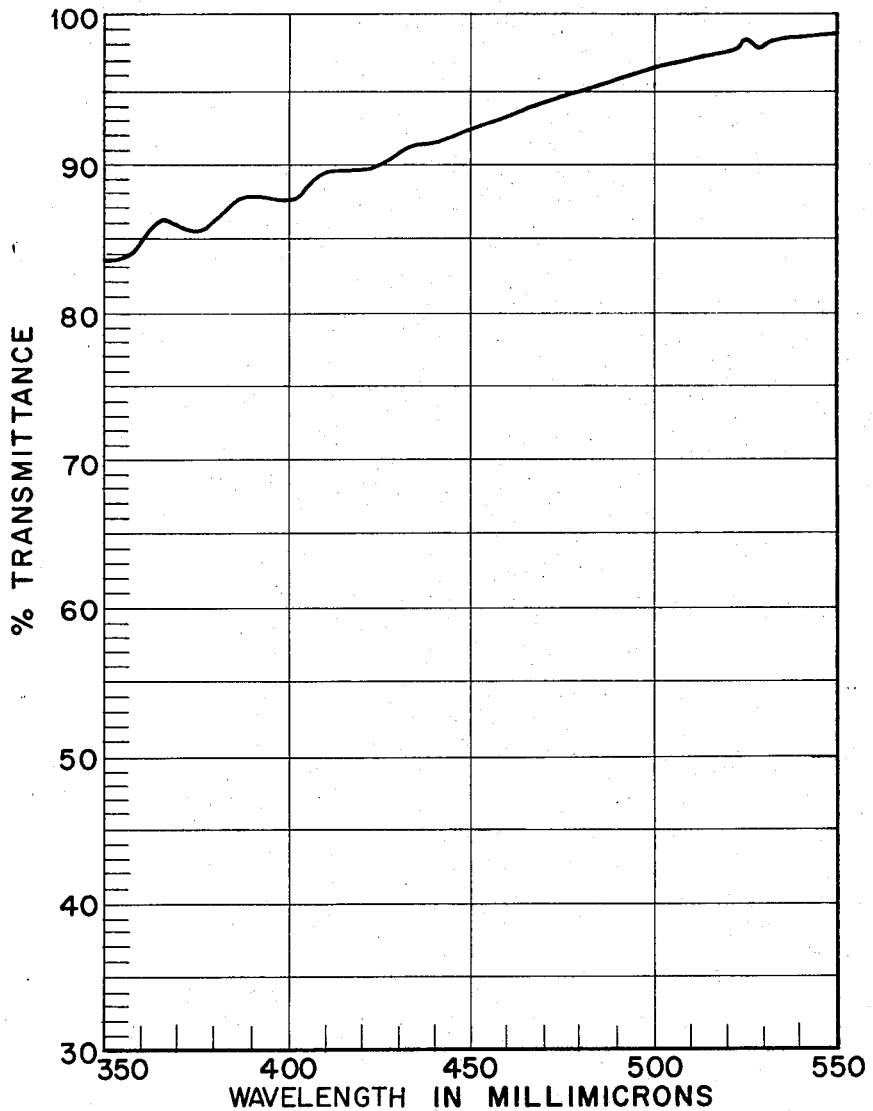

FIG. 3 is a representation of a series of spectrophotometric curves obtained from the measurement of dissolved portion of a heat cured impregnant on glass fiber reinforced tire cord where the impregnant comprised a vinylidene chloride-acrylic-copolymer; and FIG. 4 is a representation of a spectrophotometric curve obtained from the measurement of dissolved portions of a heat cured impregnant on glass fiber reinforced tire cord where the impregnant comprised a vinyl chloride homopolymer.

Accordingly, it is an object of this invention to provide a new method for controlling the degree of cure of a vinyl chloride or a vinylidene chloride copolymer, or a vinyl chloride or a vinylidene chloride homopolymer.

It is a further object of this invention to provide a new method for controlling the degree of cure of a heat-curable coating or impregnant on glass fibers where the coating or impregnant comprises a vinyl chloride or a vinylidene chloride polymer or copolymer.

It is a still further object of this invention to provide a new method for controlling the degree of cure of a heat-curable, synthetic resinous coating on glass fibers where the coating comprises a vinyl chloride or a vinylidene chloride polymer or copolymer.

Other objects and advantages of the invention will become apparent from the following description.

EXAMPLE I

A heat-curable resinous coating composition comprising a vinyl chloride-vinylidene chloride copolymer, suitable for impregnating glass fibers, was prepared from the indicated ingredients as described below:

Parts [1]

Part A:
- Cold deionized water --------------------- 732
- Sodium hydroxide (50% solution) ---------- 1.0
- Resorcinol formaldehyde polymer in the form of resin containing 75% solids ---------- 48
- Formaldehyde (37% solution) -------------- 16

Part B:
- Butadiene - styrene - vinylpyridine terpolymer (41% solids) --------------------------- 900
- Ammonium hydroxide (26° Bé.) ------------- 80

Part C:
- Cold deionized water --------------------- 200
- Ammonium hydroxide ----------------------- 15
- Vinyl chloride - vinylidene chloride copolymer (50% solids) --------------------------- 350
- Microcrystalline paraffin wax (55% solids) --- 200

[1] The terms "percent" and "parts" are used herein and in the appended claims to refer to percent and parts by weight, unless otherwise indicated.

Part A in the above example was separately prepared and then aged for 2-3 hours with alkali present in an amount sufficient to adjust the mixture to a pH in the range of 7-7.5. Part B and Part C were prepared, and the three parts were combined to produce the impregnant. While aging of the mixture is not essential, beneficial results such as greater adhesion and stabilization of the mixture occurs when the mixture is aged from 10-24 hours before use as an impregnant.

A suitable resorcinol formaldehyde resin, which contributes to the adhesion of the impregnant composition onto the glass fiber surfaces, is manufactured by Koppers Company, and sold under the trade name Penacolyte 2107.

A suitable terpolymer, which functions as a cushion and filler to help align the glass fibers to gain the greatest increase in physical and mechanical properties, is manufactured by General Tire and Latex Company, and sold under the trade name GENTAC F.S.

An 80 percent vinyl chloride—20 percent vinylidene chloride copolymer useful for the above formulation, as manufactured by Dow Chemical Company, is sold under the trade name Dow Latex 874.

The microcrystalline paraffin wax was present in an amount in excess of that capable of remaining compatible with the remainder of the solids of the impregnant. The excess wax component sweats out for concentration on the surfaces of the impregnated glass fiber bundles to provide a non-tacky surface. Such a wax, as manufactured by General Latex and Chemical Corporation, is sold under the trade name Vultex Wax Emulsion No. 5.

Individual glass filaments were coated with the coating composition produced as described above, and were then drawn through a body of the composition to achieve as complete coating of the glass fibers as possible. The cure of the composition on the glass fibers was controlled by the method of the invention as described below.

Control samples of the impregnated tire cord were cured to varying degrees by heating in a continuous oven, maintained at 560° F., for varying periods of time. For convenience, the plurality of curing conditions was achieved by maintaining the oven temperature constant, and varying the speed at which the coated fibers were advanced through the oven. Tests were run on portions of the control samples to determine physical properties at the varying degrees of cure. The spectrophotometric transmittance of dissolved portions of the control samples was determined by the method outlined below. The percent transmittance as a function of the degree of cure was then correlated to the physical properties.

A 125 ml. Erlenmeyer flask was charged with a 25 ml. portion of ethyl acetate and a 1.0 g. control sample of tire cord. The sample was allowed to stand in contact with the solvent for 15 minutes, and then the solvent was decanted into a ¾ inch test tube. The percent transmittance of the solvent, containing the extract from the coating, was determined in the visible range between 340–550 millimicrons by standard operating procedures using a Bausch & Lomb, Inc., Spectronic Model 20 Colorimeter. The percent transmittance of the solvent from each control sample was determined by the same method as outlined above. Other continuous, recording, spectrophotometers can equally well be used.

A control sample, having desired physical properties, was selected as a control standard. Cure of the coating composition was then controlled by periodically sampling and determining the spectrophotometric transmittance of cured samples from the process. The samples, having the same composition as the control samples, were extracted and the transmittance determined by the procedure described above. The transmittance of the samples was then compared with the transmittance of the standard control sample. The severity of the curing conditions was then increased, decreased, or maintained constant to maintain the monitored transmittance within a selected range, thereby achieving the desired level of cure.

A suitable solvent must be capable of extracting the degradation products produced by the cure of the vinyl chloride or vinylidene chloride polymer. The solvent should have substantially no absorbance in the visible range between 340–550 millimicrons.

The suitability of any given solvent may easily be determined by measuring the transmittance of the solvent by running the solvent as a "blank" to obtain a reference curve. A sample of the vinyl chloride or vinylidene chloride polymer is then extracted with the solvent, and the transmittance measured. At normal cure, the transmittance of the extract should be no greater than 85 percent. If so, the solvent is suitable.

Solvents which can be employed are oxygenated organic compounds such as esters and ketones, or mixtures. Illustrative suitable esters are ethyl acetate, n-propyl acetate, isopropyl acetate, n-butyl acetate and methyl-amyl acetate. Illustrative suitable ketones are acetone, methyl ethyl ketone, methyl isobutyl ketone and diisobutyl ketone.

Figure 1:
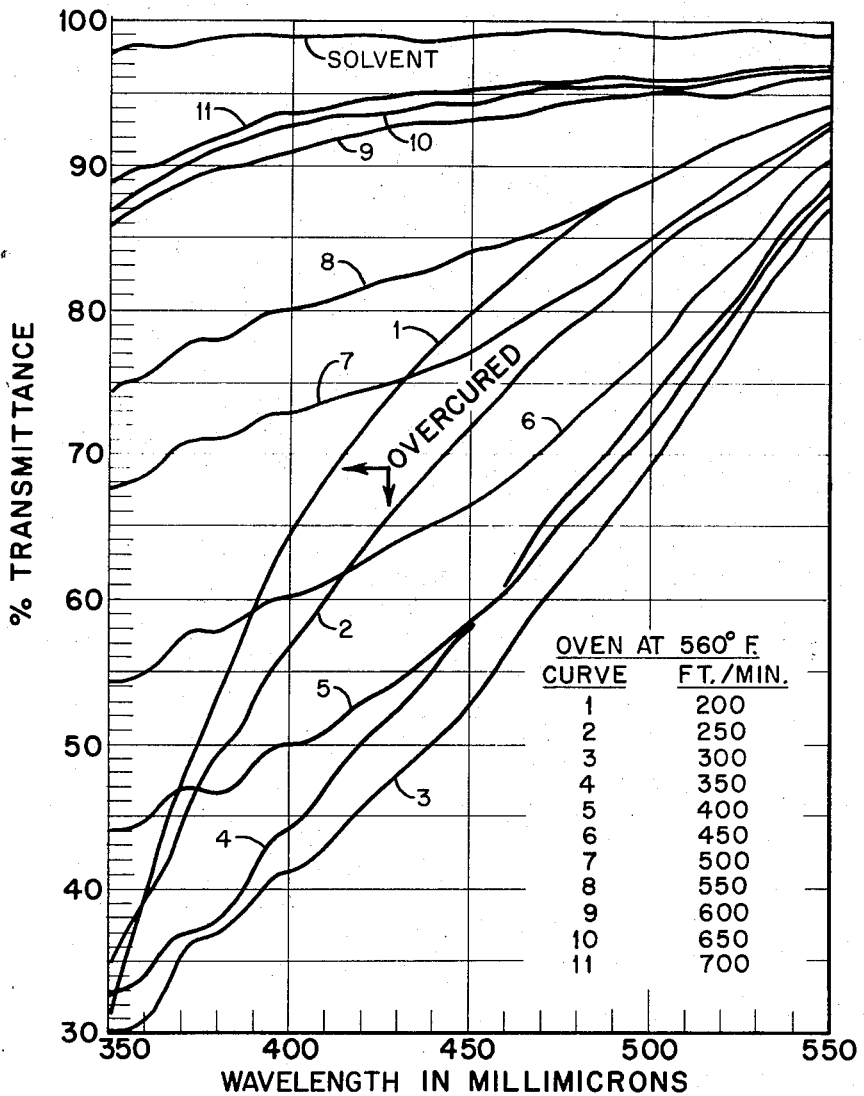
FIG. 1 is a representation of a series of spectrophotometric curves obtained from the measurement of dissolved portions of a heat cured impregnant on glass fiber reinforced tire cord where the impregnant comprised a vinylidene chloride-vinyl chloride-copolymer.

FIG. 1 shows the spectrum of the dissolved portions of control samples obtained by the method described above. These series of spectrophotometric curves obtained from the measurement of the control samples exposed to different degrees of cure is shown. The rate and degree of cure of the impregnant can be changed by varying the time-temperature exposure levels. At a constant temperature, the degree of cure is inversely proportional to the line speed. It has been found that grossly overcured samples, such as samples 1–4, can be measuerd at 350 millimicrons or below, since at higher wave lengths the percent transmittance of the samples overlaps. It is preferred, however, to make the measurements of transmittance at a wave length of 350 millimicrons or greater, and to use the subsequently discussed "slope" technique to distinguish, if necessary, grossly overcured from normally cured materials.

Cure of a heat-curable composition comprising a vinyl chloride or a vinylidene chloride polymer or copolymer can be easily controlled by the method of the invention. For each impregnant composition, an initial determination of spectrophotometric transmittance of a series of control samples, having varying degrees of cure, is correlated with the physical properties of the control samples. A sample having desired physical properties is then selected as a standard. To control the cure process thereafter, only periodic samples are obtained, and the spectrophotometric transmittance is determined. The severity of the curing conditions is increased, decreased, or maintained constant to maintain the transmittance within the selected range and, as a consequence, to achieve the desired level of cure, corresponding with desired physical properties.

In some instances, a single transmittance measurement may not be adequate to determine the degree of cure. Referring to FIG. 1, if the transmittance is determined at a wave length of 370 millimicrons, and if the transmittance value obtained is at the intersection of curve 5 and curve 1, it is impossible to determine the degree of cure of the sample. However, FIG. 1 shows that the slope, defined as $dT/d\lambda$ of the "normal" cured and overcured samples is drastically different. Thus, by measuring the transmittance of the extracted sample at another wave length and calculating the slope of the curve between the two values, it can be determined whether the degree of cure is indicated by curve 5 or curve 1.

Example II

A heat-curable composition comprising a vinylidene chloride-vinyl chloride-copolymer was prepared as described in Example I. The same formulation there set forth was used, except that the solids concentration of the vinylidene chloride-vinyl chloride-copolymer was varied as indicated in FIG. 2.

Figure 2:
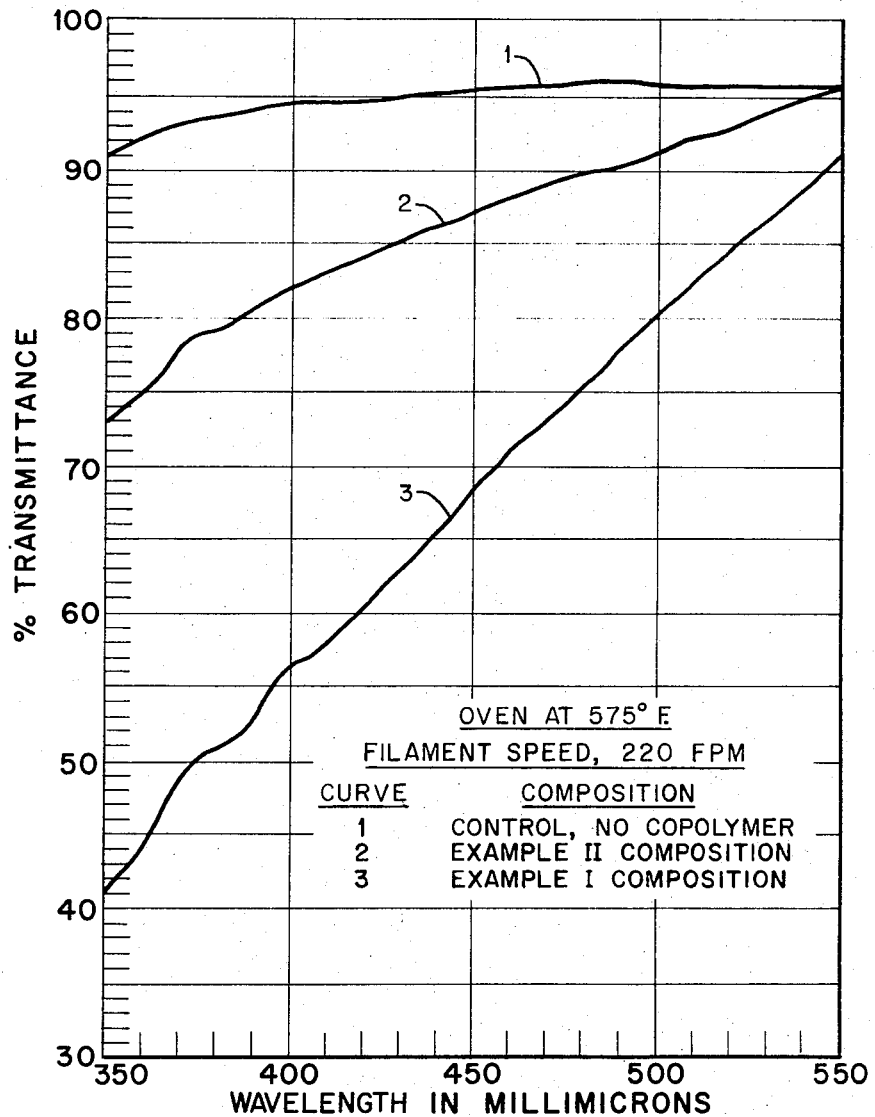
FIG. 2 is a representation of a series of spectrophotometric curves obtained from the measurement of dissolved portions of a heat cured impregnant on glass fiber reinforced tire cord where the impregnants comprised a vinylidene chloride-vinyl chloride-copolymer in varying concentrations.

FIG. 2 shows the spectrum of the dissolved portions of the "normal" cured samples. Sample 1 is a control sample, having no vinylidene chloride-vinyl chloride-copolymer present. Sample 3 has the same formulation as in Example I while Sample 2 has a reduced vinylidene chloride-vinyl chloride-copolymer solids concentration, 25 percent of Sample 3.

Ordinarily, the amount of the vinyl- or vinylidene polymer or copolymer present in a heat-curable composition that is cured according to the method of the invention should reduce the transmittance of an extract of the properly cured composition to not more than 85 percent. From the data reported in Example II and other studies, it has been determined that at least about 1 percent of the indicated copolymer is required in the Example II composition. The influence of greater quantities is shown by curves 2 and 3 of FIG. 2. The minimum amount of another vinyl- or vinylidene polymer or copolymer required to practice the invention can easily be determined experimentally by varying the amount thereof as in Exampe II, to the extent necessary to demontrate the minimum at which the transmittance is not greater than 85 percent. As in the Examples herein, more than the minimum can be used, and frequently will be desirable. Insofar as the instant invention is concerned, there is no upper limit on the amount of the polymer or copolymer used so long as the overall curable composition has desired properties.

The need for the control method of the invention is demonstrated by a comparison of curve 3, FIG. 2, and curve 2, FIG. 1. Curve 2 illustrates gross overcure under less severe (in terms of measured temperature and line speed) than those which gave normal cure for curve 3. As stated elsewhere, ambient conditions, age of the curable composition, the temperature profile of the oven in which cure is accomplished, and the accuracy of the temperature sensing and controlling apparatus must all be considered carefully if cure is to be controlled by means other than the method of the invention. The comparison to which attention is directed in this paragraph demonstrates that these, and perhaps other, variables are so significant that gross overcure can be caused by conditions that are less severe in terms of both line speed and temperature than those which cause proper cure of the same composition at a different time, perhaps in a different oven.

Example III

A heat-curable composition comprising a vinylidene chloride-acrylic copolymer was prepared as described in Example I, and using the formulation there set forth, except that an equal weight, based upon resin solids, of a vinylidene chloride-acrylic copolymer was substituted for the vinyl chloride-vinylidene chloride copolymer. The copolymer was produced from 96 percent of vinylidene chloride and 4 percent of an acrylic monomer. An operable copolymer can be purchased from Rohm and Haas under the designation Darvon 66919 M.

FIG. 3 shows the spectrum of the dissolved portion of two control samples. As in Example I, the degree of cure is inversely proportional to the line speed, when the temperature is maintained constant.

Example IV

A heat-curable composition comprising a vinyl chloride homopolymer, was prepared as described in Example I. The same formulation there set forth was used, except that an equal weight, based upon resin solids, of a vinyl chloride homopolymer was substituted for the vinylidene chloride-vinyl chloride-copolymer. An operable homopolymer can be purchased from B. F. Goodrich Chemical Company under the designation GEON 151.

FIG. 4 shows the spectrum of the dissolved portion of an extract in ethyl acetate of tire cord cured at 200 feet per minute in an oven maintained at a control temperature of 560° F.: a normal curve was achieved. The spectrum of FIG. 4 demonstrates that the cure of the Example IV composition, because of the presence therein of the vinyl chloride homopolymer, could be controlled according to the method of the instant invention.

Experimental work indicates that heating of the vinylidene chloride or vinylidene chloride impregnant causes loss of HCl and produces polyene degradation products. The degradation products are removed from the impregnant during the extraction by the organic solvent. The polyene degradation products absorb in the 350–550 millimicron region, and thus an increase in the amount of polyene present in the solvent produces a decrease in spectrophotometric transmittance, and conversely, an increase in absorbance.

As seen by an examination of FIGS. 1 and 3, as the degree of cure increases, both the absorbance and slope of the absorbance curve of the dissolved portions of the impregnant also increases in the 350–550 millimicron region. FIG. 1 shows that at a constant curing temperature of 560° F., a "threshold value" is reached at a line speed of 250 feet per minute. At this "threshold value," the impregnant is overcured, and a sharp decrease in the absorbance and a large change in the slope of the absorbance occurs. Apparently there is a change in the degradation products at the "threshold value." The degradation products from the impregnant cured at the "threshold value" absorb at a lower wave length than the degradation products obtained from the low and normal cured impregnant. This produces a pronounced change in the slope of the absorbance curve at the "threshold value."

Control and determination of the degree of cure of various other elastomeric impregnants was attempted. An impregnated tire cord containing a neoprene component, which also contains a chloride atom, did not show a decrease in transmittance inversely proportional to the degree of cure when extracted with an organic solvent according to the method of the invention.

It is apparent from the foregoing that the method of the invention provides a quick and accurate method of determining and controlling a degree of cure of a vinylidene chloride polymer. Such vinylidene chloride polymeric components are especially useful in the manufacture of glass fiber-elastomeric products such as reinforced tire cord.

What I claim is:

1. In a method for producing a group of individually coated glass filaments which includes the steps of applying to the filaments a heat-curable synthetic resinous coating composition containing a heat-curable resin and a polymer selected from the group consisting of vinylidene chloride polymers, vinylidene chloride copolymers, vinyl chloride polymers and vinyl chloride copolymers, and passing the coated filaments through a heated oven to cause cure of the coating composition, the improvement of
   (a) periodically extracting a given weight of the cured coating composition with a given volume of a given organic solvent,
   (b) determining the spectrophotometric transmittance of the resulting extract at at least one predetermined wave length from about 340 to 550 microns, and
   (c) increasing or decreasing the severity of the curing conditions used in the oven whenever the monitored transmittance is, respectively, above or below a transmittance value which has been previously determined to indicate a desired degree of cure.

2. In a method as claimed in claim 1, the improvement wherein transmittance is monitored at at least two different wave lengths from about 350 to about 500 millimicrons and the wave lengths differ by at least about 25 millimicrons, and decreasing the severity of the curing conditions used in the oven whenever either the monitored transmittance at the lower of the two wave lengths or the slope of a straight line plot of transmittance versus wave length between the wave lengths at which transmittance, is monitored is above, or increasing the severity of curing conditions when both the monitored transmittance and said slope are below corresponding values which have been previously determined to indicate a desired degree of cure.

References Cited

UNITED STATES PATENTS

| 3,248,368 | 4/1966 | Biefeld | 23—230 R |
| 3,065,350 | 11/1962 | Graner | 117—66 |
| 3,383,350 | 5/1968 | Pettyjohn | 23—230 R |

WILLIAM D. MARTIN, Primary Examiner

D. COHEN, Assistant Examiner

U.S. Cl. X.R.

117—126 GB; 23—230 R